United States Patent [19]
Painter

[11] Patent Number: 5,007,789
[45] Date of Patent: Apr. 16, 1991

[54] VEHICLE WHEEL MOUNTING APPARATUS

[76] Inventor: Michael A. Painter, 15401 Stonewood Ter., Sherman Oaks, Calif. 91403

[21] Appl. No.: 414,661

[22] Filed: Sep. 29, 1989

[51] Int. Cl.$^5$ ............................................. B60B 29/00
[52] U.S. Cl. .................................. 414/427; 414/426; 414/785; 254/2 R
[58] Field of Search ............... 414/426, 427 T, 428, 414/429, 430, 589, 590, 785, 911, 433; 254/2 R, 2 B, 2 C

[56] References Cited

U.S. PATENT DOCUMENTS

| | | | |
|---|---|---|---|
| 2,217,898 | 10/1940 | Gemmill | 414/427 |
| 2,380,415 | 7/1945 | Carruthers | 414/429 |
| 2,569,050 | 9/1951 | Gref et al. | 414/430 X |
| 2,656,050 | 10/1953 | Best et al. | 414/430 X |
| 3,951,287 | 4/1976 | Cofer | 414/427 |
| 4,050,597 | 9/1977 | Hawkins | 414/427 |

*Primary Examiner*—Frank E. Werner
*Attorney, Agent, or Firm*—Michael A. Painter

[57] ABSTRACT

A device for assisting in the mounting of a vehicle wheel. The present invention apparatus is adapted to provide apparatus for lifting a vehicle wheel to the height of a vehicle axle hub and mounting bolts and position the wheel for mounting thereon. A mounting base is equipped with a plurality of roller assemblies which permit the apparatus to be moved in all directions along the ground or other supporting surface. A supporting guide frame is secured to the mounting base to provide a positioning guide for lifting the vehicle wheel. A wheel positioning frame is slidably coupled to the positioning frame. The wheel positioning frame is curved to receive the vehicle tire. A plurality of rollers are coupled to the positioning frame in parallel spaced relation, the axis of each roller being adapted to be oriented parallel to the vehicle axle. A hoist assembly is coupled between the mounting base and the wheel positioning frame for raising the wheel positioning frame relative to the mounting base.

5 Claims, 2 Drawing Sheets

VEHICLE WHEEL MOUNTING APPARATUS

BACKGROUND OF THE INVENTION

1. Field of the Invention.

The present invention generally relates to vehicle maintenance tools and more particularly to those tools adapted as aids for mounting wheels upon vehicles.

2. Prior Art.

The present invention specifically addresses a problem which is inherent in vehicle maintenance. The prior art exhibits numerous devices which are used to vertically lift the vehicle to provide for general maintenance of the vehicle, and in particular, to lift the vehicle for the purpose of mounting a vehicle wheel. The need for the present invention has arisen as a result of the increased use of oversized vehicle tires and wheels. Although the prior art exhibits equipment specifically adapted for the purpose of lifting a vehicle, the equipment does not address the specific problem created by the combined weight of the tires and wheels now in commercial use.

The weight of a typical tire and wheel in common use can exceed 75 pounds. The most common devices exhibited by the prior art for lifting a wheel to the height of the vehicle axle are conventional pneumatic or mechanical lifts having a vertically moveable surface. These devices totally fail to address the problem inherent in mounting vehicle tires and wheels upon the vehicle. Vehicle wheels include a central aperture to be aligned with the hub of the vehicle axle and a plurality of apertures adapted for receiving mounting bolts. Since the number of mounting bolts may vary from vehicle to vehicle, it is clear that, irrespective of vertical height, a wheel must be capable of being rotated about its axis in order to engage the mounting bolts. Although pneumatic and mechanical lifts are typical of the devices disclosed in the prior art, neither they nor other vertical lifting devices provide means for properly positioning a vehicle wheel to facilitate engagement between the wheel and the vehicle axle and mounting bolts.

The present invention substantially resolves the problems inherent in those devices disclosed by the prior art. The present invention concurrently provides the means to longitudinally position the vehicle wheel relative to the vehicle axle, vertically raise the height of the wheel for engaging the hub of the vehicle axle and rotatably position the wheel so that it may be coupled to the mounting bolts. Once the wheel is placed upon the present invention apparatus, the wheel can be mounted without the need to exert any undue manual force to either raise or to rotate the vehicle wheel to a proper position.

SUMMARY OF THE INVENTION

The present invention comprises an apparatus for aiding in the mounting of a vehicle wheel. The present invention is intended to obviate the need to expend undue physical force when a user is required to change a vehicle tire. Once a vehicle has been vertically lifted and the selected wheel removed, the vehicle axle will be vertically raised above the position of a tire resting on the supporting surface. To properly mount a vehicle wheel, the receiving apertures on the vehicle wheel must be positioned to receive the hub of the vehicle axle as well as the mounting bolts. The present invention provides the ability to align the wheel with the axle, vertically raise the wheel to the height of the vehicle axle and rotate the wheel about its axis for the purpose of aligning it with the mounting bolts.

A mounting platform is provided with a plurality of rollers which will permit horizontal movement of the vehicle wheel until it is longitudinally aligned with the axle upon which it is to be mounted. A wheel positioning frame is slidably coupled to supporting guides extending upwardly from the supporting base. The wheel positioning frame has a radius of curvature which approximates that of a conventional vehicle tire. A plurality of rollers are rotatably coupled to the wheel positioning frame, the rollers being in parallel spaced relation to each other. The axis of each roller is substantially perpendicular to the plane of the supporting guides and will be placed parallel to the vehicle axle. A hoisting assembly is coupled intermediate the mounting base and the wheel positioning frame in order to vertically elevate the wheel which is placed upon the positioning frame. The hoisting assembly elevates the vehicle wheel until it is in position to receive the vehicle axle and mounting bolts. By applying rotational force to the vehicle tire, the plurality of rollers permit the wheel to be rotated about its axis until the mounting bolts are aligned with the receiving apertures in the wheel.

It is therefore an object of the present invention to provide an improved apparatus to aid in the mounting of a vehicle tire and wheel.

Another object of the present invention is to provide a device for positioning a vehicle wheel for mounting upon a vehicle.

It is still another object of the present invention to provide a device for aiding in the mounting of a vehicle wheel irrespective of the number of mounting bolts employed by the vehicle.

It is still yet another object of the present invention to provide an improved vehicle wheel mounting apparatus which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figure 1:
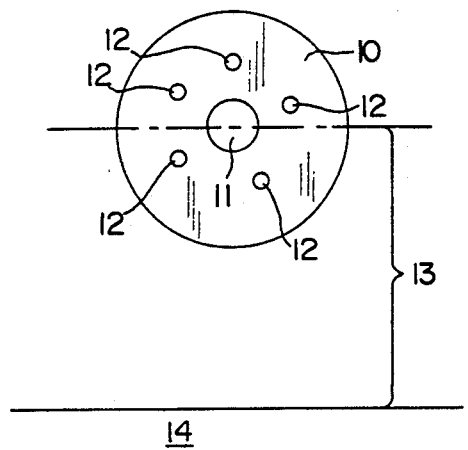
FIG. 1 is a schematic, front elevation view of the terminus of a vehicle axle illustrating the vehicle hub and wheel mounting bolts.
Figure 2:
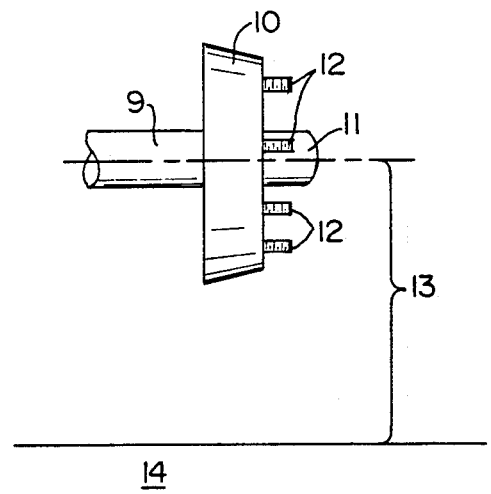
FIG. 2 is a schematic, side elevation view of the vehicle axle shown in FIG. 1.

The present invention is addressed to the common problems inherent in the task of changing a vehicle wheel and tire. FIG. 1 and FIG. 2 schematically illustrate the terminus of a vehicle axle 9. To properly mount the vehicle wheel, it must be fully positioned upon the wheel hub 10, axle hub 11 and fully engage the complement of mounting bolts 12. One of the problems encountered in changing a vehicle wheel relates to the variables encountered. To change a vehicle wheel, the axle 10 is lifted to a varying vertical height 13 above the supporting surface 14. Additionally, the number of mounting bolts 12 can vary from vehicle to vehicle, the orientation of the mounting bolts 12 being totally random. As a result, in order to properly engage a vehicle wheel with wheel hub 10, axle hub 11 and mounting bolts 12, the present invention concurrently provides the ability to position the wheel along the supporting surface 14, accurately raise the vertical height of the wheel to the height 13 of axle hub 11, and lastly, to rotate the wheel about its axis to engage mounting bolts 12.

Figure 4:
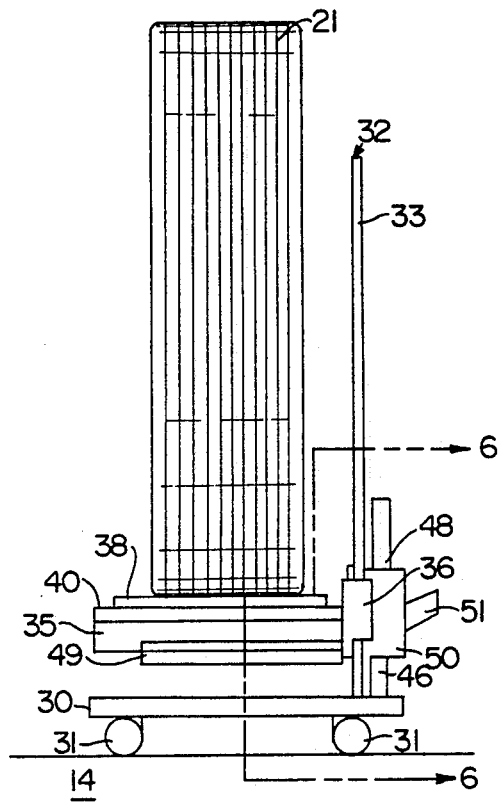
FIG. 4 is a side elevational view of the present invention vehicle wheel mounting apparatus having a vehicle tire and wheel disposed therein shown in a partially elevated position.
Figure 3:
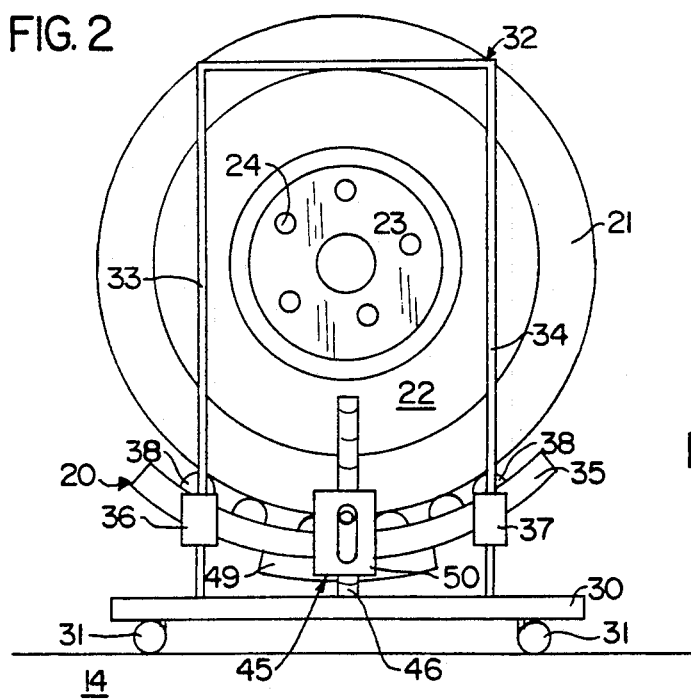
FIG. 3 is a front elevation view of the present invention vehicle wheel mounting apparatus illustrating a vehicle wheel and tire placed thereon.

The present invention can be best understood by reference to FIG. 3 and FIG. 4 wherein the present invention vehicle wheel mounting apparatus is generally designated by the reference numeral 20. For the purpose of example, a conventional vehicle tire 21 and a wheel 22 are shown in place upon the present invention apparatus 20. Wheel 22 is adapted to be mounted upon the schematically depicted axle hub 11 and mounting bolts 12. Wheel 22 is a conventional, known structure and includes a hub aperture 23 and bolt alignment apertures 24 which are concentrically placed about hub aperture 23 in a pattern which is equivalent to hub 11 and mounting bolts 12. Although the drawing illustrates the use of five mounting bolts, it is understood this is for the purpose of example only, the number of mounting bolts and the placement thereof varying from vehicle to vehicle.

A mounting base 30 is provided with a plurality of positioning wheels 31 which will permit the present invention apparatus 20 to be horizontally moved across supporting surface 14. In the embodiment of the present invention shown in FIG. 3 and FIG. 4, the mounting base is rectangular and employs a positioning wheel at each corner. It is understood that the geometry of mounting base 30 and the number of positioning wheels 31 need only be sufficient to provide a stable base for apparatus 20.

Tire support frame 32 is securely mounted along an edge of mounting base 30 and extends upwardly therefrom perpendicular to the platform formed by mounting base 30. Tire support frame 32 includes a pair of parallel positioning guides 33 and 34 which act as guides for vertically raising the tire and wheel 21 and 22. Wheel positioning frame 35 serves as a platform for tire 21 and is coupled to positioning guides 33 and 34 through use of positioning sleeves 36 and 37, respectively. Parallel positioning guides 33 and 34 are sufficiently separated from each other to allow the user unrestricted access to the bolt alignment apertures 24 and, after mounting of the wheel 22, access to mounting bolts 12 for the purpose of engaging the wheel nuts (not shown). As will be discussed in detail hereinbelow, wheel positioning frame 35 is equipped with a plurality of tire positioning rollers 38 which facilitate the rotation of tire 21 and wheel 22 about their common axis for the purpose of mounting same upon the vehicle.

The structure of wheel positioning frame 35 can be best seen by reference to FIG. 3 and FIG. 4. Wheel positioning frame 35 is rectangular, the longitudinal edges thereof being arcuate. The radius of curvature of the arcuate edges of frame 35 adapted approximates the curvature of the tread surface of tire 21. As stated hereinabove, positioning sleeves 36 and 37 are secured along a longitudinal edge of positioning frame 35, each of the sleeves 36 and 37 having an aperture there through for slidably receiving positioning guides 33 and 34, respectively.

Figure 5:
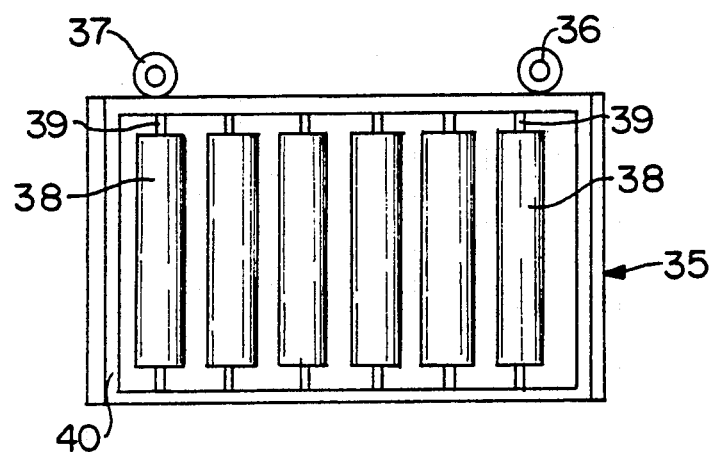
FIG. 5 is a top plan view of the wheel positioning frame shown in FIG. 2 and FIG. 4.

The ability to rotate tire 21 and wheel 22 about their common axis is provided by a plurality of rollers 38. As can be seen in FIG. 4, the rollers 38 are placed in parallel, spaced relation between the arcuate longitudinal edges of wheel positioning frame 35. Each roller 38 is secured within positioning frame 35 by a conventional axle 39 about which the roller 38 is suitably journaled through the use of conventional bearings or the like. As can be best seen in FIG. 3 and FIG. 5, each of the equally spaced axles 39 are secured within wheel supporting frame 35 in a manner which is sufficient to allow the cylindrical surface of rollers 38 to uniformly extend above the upper surface 40 of positioning frame 35. This allows the tread of tire 21 to freely move across the surfaces of rollers 38.

Figure 6:
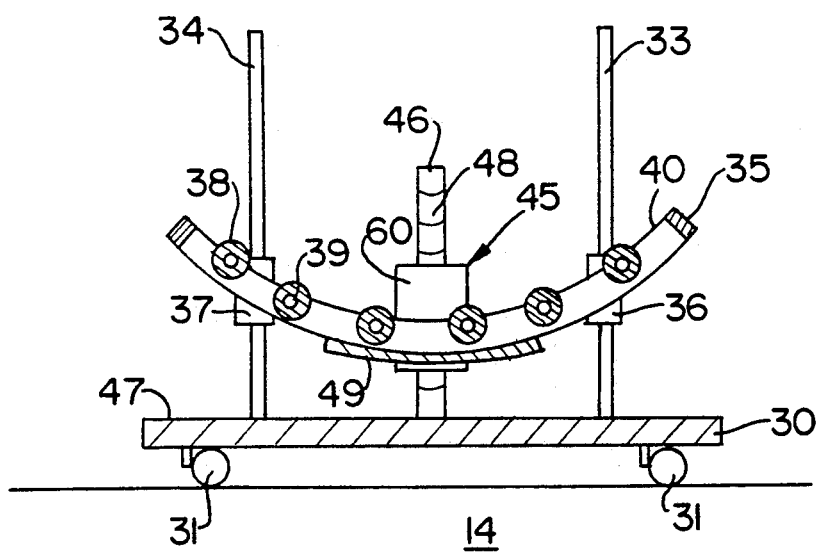
FIG. 6 is a partial, cross-sectional view of the hoisting assembly, wheel positioning frame and mounting base shown in FIG. 3 taken through line 6—6 of FIG. 4.

In order to facilitate the mounting of wheel 22, it is necessary to vertically raise wheel 22 so that the hub aperture 23 is vertically raised to the same vertical height 13 as axle hub 11. The hoisting assembly used to vertically raise tire 21 and wheel 22 can be best seen by reference to FIG. 6. The hoisting assembly is generally designated by the reference numeral 45. It should be understood that the present invention can be implemented through the use of other conventional hoisting apparatus such as used in pneumatic or scissor jacks, the assembly shown herein being for the purpose of example only.

In the preferred embodiment of the present invention, a lifting guide 46 is mounted upon the upper surface 47 of mounting base 30 and extends upwardly perpendicular to mounting base 30. The length of lifting guide 46 is determined by the distance which axle 9 is raised above its quiescent position. Since the vehicle wheel can be changed when the tread of the tire is disengaged from contact with support surface 14, lifting guide 46 will be less than 12 inches in length. The hoisting assembly 45 shown in FIGS. 3, 4 and 6 comprises a similar structure to that employed in conventional vehicle jacks. In the embodiment shown, lifting guide 46 is provided with a series of spaced, ratchet settings 48 which determine the vertical height to which wheel positioning frame 35 will be raised and locked. Lifting flange 49 is secured to housing 50 of hoisting assembly 45, wheel positioning frame 35 being disposed upon lifting flange 49. The described hoisting assembly 45 employs a lever actuator to incrementally engage ratchet settings 48 and thereby change the position of housing 50 along lifting guide 46 to the selected vertical position.

In operation, the spare tire 21 and wheel are placed upon rollers 38 of wheel positioning frame 35. Facilitated by positioning wheels 31, the present invention apparatus can be positioned in proximity to the elevated vehicle axle 9. By actuating hoisting assembly 45, wheel positioning frame 35 is vertically raised until hub aperture 23 is approximately at the height 13 of axle hub 11. Once in place, tire 21 is rotated about its axis until the pattern of bolt alignment apertures 24 match the position and pattern of mounting bolts 12. When in place, wheel 22 is fully in position to engage wheel hub 10, axle hub 11 and mounting bolts 12. It can therefore be seen that the present invention vehicle mounting apparatus improves provides the ability to mount a vehicle wheel irrespective of the weight of the combined tire and wheel or the characteristics of the height or placement of the vehicle axle.

I claim:

1. A vehicle wheel mounting apparatus for mounting a vehicle tire and wheel upon a vehicle axle comprising:
   (a) a mounting base having a top and bottom surfaces;
   (b) a plurality of wheel assemblies secured to the bottom surface of said mounting base;
   (c) a positioning guide secured to the mounting base and extending upwardly from the top surface thereof;
   (d) a wheel positioning member comprising an arcuate positioning frame having arcuate top and bottom surfaces and first and second longitudinal edge surfaces, the latter being in parallel spaced relation to each other;
   (e) a plurality of equally spaced roller assemblies, each roller assembly including an axle and a cylindrical roller suitably journaled thereabout, each axle being secured between the first and second longitudinal edge surfaces, said roller assemblies being in parallel relation to each other, the cylindrical surface of each of said rollers uniformly extending above the arcuate top surface of said positioning frame, the cylindrical surfaces of said rollers being in contact with and adapted to uniformly support the vehicle tire whereby the tire may be rotated about its axis for alignment with the axle;
   (f) guide means for guiding the vertical movement of said wheel positioning member along the positioning guide, said guide means coupled to the first longitudinal edge surface of said positioning frame; and
   (g) hoisting means for lifting said wheel positioning member relative to the mounting base, said hoisting means being coupled intermediate the positioning frame and said mounting base.

2. A vehicle wheel mounting apparatus as defined in claim 1 wherein said positioning guide comprises a pair of vertical guide members secured to the top surface of said mounting base and extending upwardly therefrom perpendicular to the top surface of said mounting base and being in parallel spaced relation to each other, said guide means comprising a pair of guide sleeves secured to a longitudinal edge surface of said positioning frame, each of said guide sleeves being adapted to slidably engage one of said guide members, respectively, whereby said wheel positioning member vertically moves along a plane defined by said guide members.

3. A vehicle wheel mounting apparatus as defined in claim 1 wherein said hoisting means comprises:

(a) hoisting guide secured to the top surface of said mounting base and extending upwardly therefrom perpendicular to the top surface of said mounting base;
   (b) a housing disposed about said hoisting guide and being moveable upwardly and downwardly along said hoisting guide;
   (c) ratchet means for incrementally locking said housing in a fixed position relative to said hoisting guide; and
   (d) an arcuate lifting frame secured to said housing and being disposed intermediate the top surface of said mounting base and the bottom surface of said positioning frame.

4. A vehicle wheel mounting apparatus for mounting a vehicle tire and wheel upon a vehicle axle comprising:
   (a) a mounting base having horizontal top and bottom surfaces;
   (b) wheel assembly means for providing horizontal movement of the mounting base secured to the bottom surface of said mounting base;
   (c) a supporting and positioning guide secured to the top surface of said mounting base and extending upwardly therefrom and being perpendicular thereto;
   (d) a wheel positioning member slidably coupled to said support and positioning guide, said wheel positioning member comprising a rectangular arcuate positioning frame having first and second edge members is parallel, spaced relation to each other and defining top and bottom arcuate surfaces;
   (e) a plurality of roller assemblies, each comprising an axle and a cylindrical roller suitably journaled thereabout, each axle being secured between the first and second edge surfaces of said positioning frame and being equally spaced from and parallel to an adjacent axle, the cylindrical surface of each of said rollers uniformly extending above the top arcuate surface of the positioning frame, the cylindrical surfaces of each of said rollers being in contact with and adapted to fully rotatably support the vehicle tire thereon for alignment with the axle; and
   (f) lifting means for vertically raising said wheel positioning member relative to the mounting base, said lifting means being coupled to the top surface of said mounting base and the bottom surface of said positioning frame.

5. A vehicle wheel mounting apparatus as defined in claim 4 wherein said lifting means comprises:
   (a) a lifting guide secured to the top surface of said mounting base and extending upwardly therefrom perpendicular to the top surface of said mounting base;
   (b) a housing disposed about said lifting guide and being moveable upwardly and downwardly along said lifting guide;
   (c) ratchet means for incrementally locking said housing in a fixed position along said lifting guide; and
   (d) an arcuate lifting frame secured to said housing and being disposed intermediate the top surface of said mounting base and the bottom arcuate surface of said wheel positioning member.

* * * * *